United States Patent
Fogarty et al.

(10) Patent No.: US 12,281,011 B1
(45) Date of Patent: Apr. 22, 2025

(54) REACTOR FOR CONVERSION OF HYDROCARBONS AND OXYGENATES TO SYNGAS AND HYDROGEN

(71) Applicant: PCC HYDROGEN INC., Louisville, KY (US)

(72) Inventors: Timothy Griffith Fogarty, Prospect, KY (US); Jeffrey Baker Harrison, Louisville, KY (US); Devendra Pakhare, Louisville, KY (US); Timothy David Appleberry, Louisville, KY (US); Joshua Aaron Gubitz, Louisville, KY (US)

(73) Assignee: PCC HYDROGEN INC., Louisville, KY (US)

( * ) Notice: Subject to any disclaimer, the term of this patent is extended or adjusted under 35 U.S.C. 154(b) by 0 days.

(21) Appl. No.: 18/764,094

(22) Filed: Jul. 3, 2024

Related U.S. Application Data

(63) Continuation of application No. 18/486,744, filed on Oct. 13, 2023, now Pat. No. 12,060,269.

(51) Int. Cl.
  *C01B 3/32* (2006.01)
  *B01J 12/00* (2006.01)
  (Continued)

(52) U.S. Cl.
  CPC ............. *C01B 3/326* (2013.01); *B01J 12/007* (2013.01); *B01J 19/242* (2013.01); *B01J 35/56* (2024.01);
  (Continued)

(58) Field of Classification Search
  None
  See application file for complete search history.

(56) References Cited

U.S. PATENT DOCUMENTS

| 4,927,857 A | 5/1990 | McShea et al. |
| 5,070,016 A | 12/1991 | Hallberg |
| (Continued) | | |

FOREIGN PATENT DOCUMENTS

| CA | 2695336 A1 | 9/2010 |
| CN | 1748334 A | 3/2006 |
| (Continued) | | |

OTHER PUBLICATIONS

Applicant's Remarks filed Mar. 13, 2024 in U.S. Appl. No. 18/486,744 (Year: 2024).*

(Continued)

*Primary Examiner* — Colin W. Slifka

(74) *Attorney, Agent, or Firm* — HULTQUIST, PLLC; Steven J. Hultquist

(57) ABSTRACT

A non-autothermal adiabatic reactor is described, including a reactor vessel defining an interior volume therein for adiabatic reaction, an inlet assembly including one or more inlets arranged to introduce reactant(s) to the interior volume of the reactor vessel, a foam material body having a conversion catalyst thereon and/or therein, positioned in the interior volume of the reactor vessel for contacting thereof by the reactant(s) introduced to the interior volume, and an outlet arranged to discharge reaction product(s) from the reactor vessel. The non-autothermal adiabatic reactor is advantageously used to produce hydrogen from an ethanol or other hydrocarbon feedstock.

30 Claims, 2 Drawing Sheets

(51) Int. Cl.
*B01J 19/24* (2006.01)
*B01J 35/56* (2024.01)
*C01B 3/38* (2006.01)
*C01B 3/40* (2006.01)
*C01B 3/48* (2006.01)
*C01B 3/56* (2006.01)

(52) U.S. Cl.
CPC ............... *C01B 3/382* (2013.01); *C01B 3/40* (2013.01); *C01B 3/48* (2013.01); *C01B 3/56* (2013.01); *C01B 2203/0233* (2013.01); *C01B 2203/0261* (2013.01); *C01B 2203/0283* (2013.01); *C01B 2203/043* (2013.01); *C01B 2203/085* (2013.01); *C01B 2203/0883* (2013.01); *C01B 2203/1029* (2013.01); *C01B 2203/1229* (2013.01); *C01B 2203/1288* (2013.01); *C01B 2203/142* (2013.01)

(56) References Cited

U.S. PATENT DOCUMENTS

| | | | |
|---|---|---|---|
| 5,338,488 | A | 8/1994 | Choudhary et al. |
| 6,299,994 | B1 | 10/2001 | Towler et al. |
| 6,641,625 | B1 | 11/2003 | Clawson et al. |
| 7,641,889 | B1 | 1/2010 | Salinas et al. |
| 9,440,851 | B2 | 9/2016 | Hwang |
| 9,943,818 | B2 | 4/2018 | Jin et al. |
| 11,649,549 | B1 | 6/2023 | Harrison et al. |
| 2004/0077494 | A1 | 4/2004 | LaBarge et al. |
| 2004/0104109 | A1 | 6/2004 | Bors et al. |
| 2005/0260123 | A1 | 11/2005 | Deluga et al. |
| 2006/0013759 | A1 | 1/2006 | Jiang et al. |
| 2006/0014840 | A1 | 1/2006 | Schmidt et al. |
| 2006/0029539 | A1 | 2/2006 | Dutta et al. |
| 2007/0244208 | A1 | 10/2007 | Shulenberger et al. |
| 2008/0060935 | A1 | 3/2008 | Hartvingsen |
| 2010/0109339 | A1 | 5/2010 | Quinn |
| 2010/0150823 | A1 | 6/2010 | Huang et al. |
| 2014/0100294 | A1 | 4/2014 | Cohn et al. |
| 2014/0144397 | A1 | 5/2014 | Bromberg, III et al. |
| 2016/0280607 | A1 | 9/2016 | Land et al. |
| 2017/0292446 | A1 | 10/2017 | Hwang |
| 2018/0141028 | A1 | 5/2018 | Lin et al. |
| 2019/0031604 | A1 | 1/2019 | Erlandsson et al. |
| 2020/0109051 | A1 | 4/2020 | Petersen-Aasberg et al. |
| 2020/0140273 | A1 | 5/2020 | Petersen-Aasberg et al. |
| 2020/0172394 | A1 | 6/2020 | Han et al. |
| 2020/0207684 | A1 | 7/2020 | Rafique et al. |
| 2022/0041440 | A1 | 2/2022 | Mortensen |
| 2022/0170388 | A1 | 6/2022 | O'Donnell et al. |
| 2023/0147136 | A1 | 5/2023 | Harrison et al. |
| 2023/0278860 | A1 | 9/2023 | Harrison et al. |

FOREIGN PATENT DOCUMENTS

| | | |
|---|---|---|
| CN | 101407921 B | 11/2010 |
| GB | 2274284 A | 7/1994 |
| WO | 2021162799 A1 | 8/2019 |
| WO | 2019228796 A1 | 12/2019 |
| WO | 2020058859 A1 | 3/2020 |
| WO | 2022115721 A2 | 6/2022 |

OTHER PUBLICATIONS

"Autothermal"_Adjective_Dictionary, 2010.

U.S. Appl. No. 18/486,744, Reactor for Conversion of Hydrocarbons and Oxygenates to Syngas and Hydrogen, Filed Oct. 13, 2023.

"Volatile Organic Compounds in Your Home", 2024, Publisher: Minnesota Department of Health.

International Search Report and Written Opinion Issued in PCT/US22/79772 on Mar. 6, 2023.

International Search Report and Written Opinion issued on Feb. 4, 2025 for International Patent Application PCT/US2024/051172.

* cited by examiner

REACTOR FOR CONVERSION OF HYDROCARBONS AND OXYGENATES TO SYNGAS AND HYDROGEN

CROSS-REFERENCE TO RELATED APPLICATION

This is a continuation under 35 USC § 120 of U.S. patent application Ser. No. 18/486,744 filed Oct. 13, 2023, now U.S. Pat. No. 12,060,269, in the names of Timothy Griffith Fogarty, Jeffrey Baker Harrison, Devendra Pakhare, Timothy David Appleberry, and Joshua Aaron Gubitz for REACTOR FOR CONVERSION OF HYDROCARBONS AND OXYGENATES TO SYNGAS AND HYDROGEN. The disclosure of U.S. patent application Ser. No. 18/486,744 is hereby incorporated herein by reference, in its entirety, for all purposes.

FIELD

The present disclosure relates to a reactor useful for adiabatically and non-autothermally catalytically reacting feedstocks of diverse types to form useful products, and to a corresponding method of non-autothermal catalytic reaction. In various implementations, the reactor and the corresponding method may be employed for catalytic non-autothermal conversion of hydrocarbons and oxygenates to syngas and hydrogen.

DESCRIPTION OF THE RELATED ART

Approximately 75 million metric tons/year of pure hydrogen are produced globally. This hydrogen finds use in petroleum refining, steel production, food processing, and industrial manufacture of ammonia, methanol, and other chemical products.

In recent years, increasing efforts and resources have been directed to achieving efficient, cost-effective, and renewable generation of hydrogen, thereby accelerating its acceptance and use as an energy source. Hydrogen is attractive for use in fuel cells to produce electricity in a very efficient and environmentally advantageous manner, with the only byproduct being water. It is anticipated that hydrogen will be increasingly used as an energy carrier to produce electricity for mobile and small to medium scale stationary applications using fuel cells. This development will correspondingly stimulate the development of technologies for utilizing hydrogen as a clean fuel for vehicular and transport power systems.

In such circumstances, there is a need for improved process equipment and methods useful to produce hydrogen gas. Given the current fossil fuels-based economy in which hydrocarbon feedstocks are processed to produce refined hydrocarbon products, with the associated operational and environmental need to minimize discharge of greenhouse gases, there is a compelling impetus and basis for developing reactors that can process the wide variety of hydrocarbon feedstocks in an energy-efficient and environmentally benign manner to produce fuels and materials needed in current and transitioning markets.

SUMMARY

The present disclosure relates to a reactor and method for catalytic processing operations, which is usefully employed for adiabatic catalytic non-autothermal conversion of hydrocarbons and oxygenates to produce syngas and hydrogen.

In one aspect, the disclosure relates to a non-autothermal adiabatic reactor comprising a reactor vessel defining an interior volume therein for adiabatic reaction, an inlet assembly including one or more inlets arranged to introduce reactant(s) to the interior volume of the reactor vessel at an upper portion thereof, a foam material body having a conversion catalyst thereon and/or therein, positioned in the interior volume of the reactor vessel for contacting thereof by the reactant(s) introduced to the interior volume, and an outlet arranged to discharge reaction product(s) from the reactor vessel.

In another aspect, the disclosure relates to a catalytic conversion process, comprising converting one or more reactants to one or more reaction products in a non-autothermal adiabatic reactor of the present disclosure as variously described herein.

In a further aspect, the disclosure relates to a process for converting one or more gaseous reactants to one or more gaseous reaction products, comprising: impinging the one or more gaseous reactants on a foam body having a conversion catalyst thereon and/or therein in a non-autothermal adiabatic contacting zone to effect chemical conversion reaction catalyzed by the conversion catalyst on and/or in the foam body as at least part of chemical reaction performed in the non-autothermal adiabatic contacting zone producing the one or more gaseous reaction products; and discharging the one or more gaseous reaction products from the non-autothermal adiabatic contacting zone.

Other aspects, features and embodiments of the disclosure will be more fully apparent from the ensuing description and appended claims.

DETAILED DESCRIPTION

Figure 1:
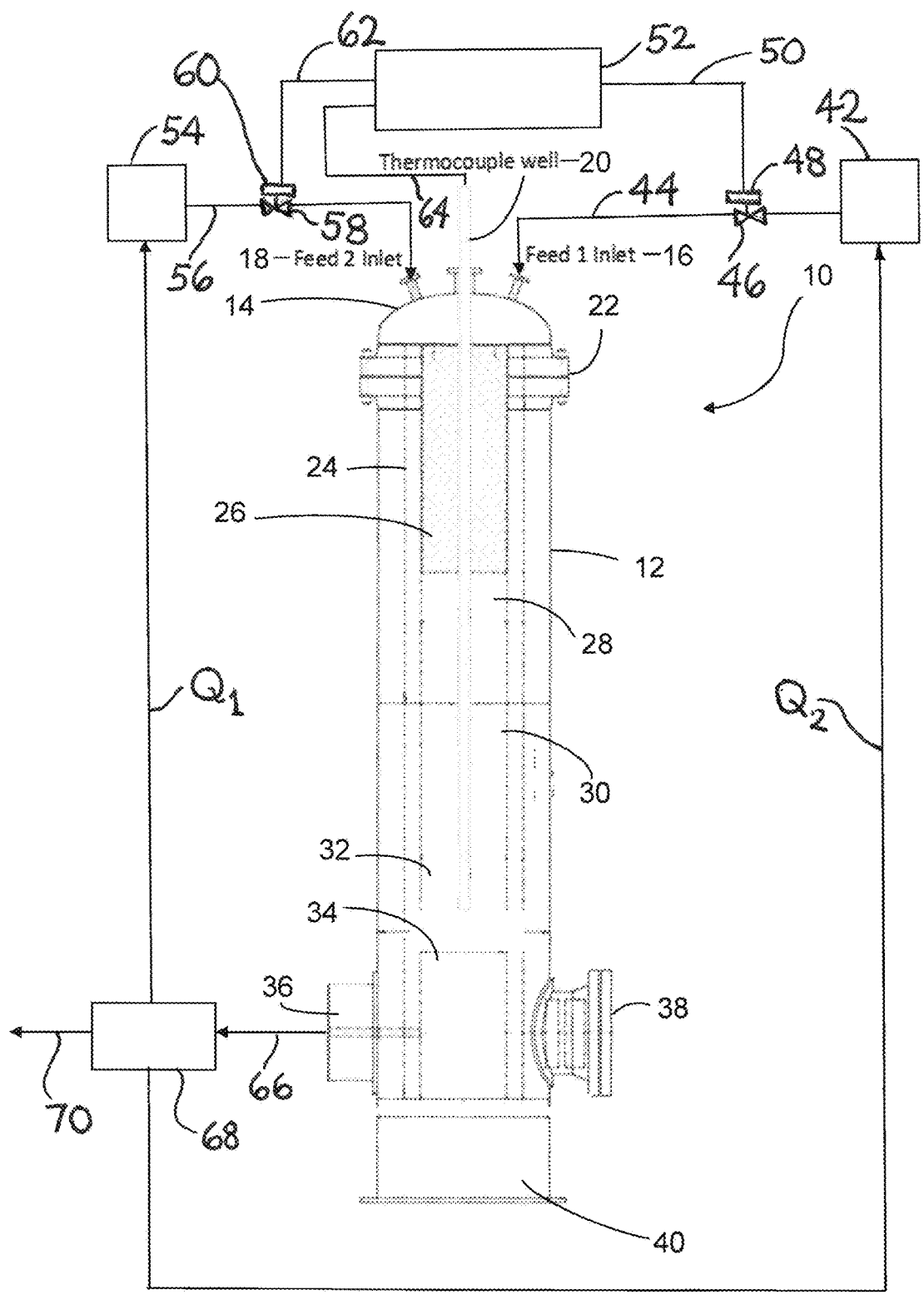
FIG. 1 is a partial sectional elevation view of a reactor that is useful for adiabatic catalytic non-autothermal conversion of hydrocarbons and oxygenates to produce syngas and hydrogen, according to one embodiment of the present disclosure.

The present disclosure relates to a reactor and process for catalytic conversion reactions. The reactor process of the present disclosure has particular utility for adiabatic catalytic non-autothermal conversion of hydrocarbons and oxygenates to produce syngas and hydrogen.

As used herein and in the appended claims, the singular forms "a", "and", and "the" include plural referents unless the context clearly dictates otherwise.

As used herein and in the appended claims, the term "oxygenates" means chemical compounds containing oxygen as part of their chemical structure, which can be non-autothermally oxidatively reformed to produce hydrogen. Non-limiting examples of oxygenates include alcohols, e.g., methanol, ethanol, isopropyl alcohol, n-butanol, and tert-butanol, and ethers, e.g., methyl tert-butyl ether, tert-amyl methyl ether, tert-hexyl methyl ether, ethyl tert-butyl ether, tert-amyl ethyl ether, diisopropyl ether, glycols, e.g., ethylene glycol, propylene glycol, butane diol, aldehydes, e.g., formaldehyde, acetaldehyde, and acids, e.g., formic acid, acetic acid, lactic acid, and citric acid.

As used herein and in the appended claims, the term "autothermal reforming" means a conversion process that is conducted with partial combustion of a feedstock fuel in the presence of oxidant, using a burner for combustion, prior to contacting with oxidation catalyst, reforming catalyst, or other type of conversion catalyst, and the term "non-autothermal oxidative reforming" means oxidative reforming that is conducted without such combustion, and in which the conversion process is effected by a catalyst.

Correspondingly, the term "autothermal" in reference to a reactor or process means a reactor or process that comprises the presence or operation of a burner for combustion, and the term "non-autothermal" in reference to a reactor or process means a reactor or process in which there is no presence or operation of a burner for combustion. The reactor and process of the present disclosure therefore do not involve or perform flame combustion.

The disclosure, as variously set out herein in respect of features, aspects and embodiments thereof, may in particular implementations be constituted as comprising, consisting, or consisting essentially of, some or all of such features, aspects and embodiments, as well as elements and components thereof being aggregated to constitute various further implementations of the disclosure. The disclosure is set out herein in various embodiments, and with reference to various features and aspects of the disclosure. The disclosure contemplates such features, aspects and embodiments in various permutations and combinations, as being within the scope of the invention. The disclosure may therefore be specified as comprising, consisting or consisting essentially of, any of such combinations and permutations of these specific features, aspects and embodiments, or a selected one or ones thereof.

The disclosure relates in various aspects to a non-autothermal adiabatic reactor comprising a reactor vessel defining an interior volume therein for adiabatic reaction, an inlet assembly including one or more inlets arranged to introduce reactant(s) to the interior volume of the reactor vessel at an upper portion thereof, a foam material body having a conversion catalyst thereon and/or therein, positioned in the interior volume of the reactor vessel for contacting thereof by the reactant(s) introduced to the interior volume, and an outlet arranged to discharge reaction product(s) from the reactor vessel.

The inlet assembly in various embodiments includes multiple inlets for introducing reactant(s) to the interior volume of the interior volume of the non-autothermal adiabatic reactor. In other embodiments, the inlet assembly may comprise a single inlet for introducing reactant(s) to the interior volume of the non-autothermal adiabatic reactor. The inlet(s) in the inlet assembly may be oriented at an angle with respect to the central axis of the reactor vessel, e.g., so that the reactant(s) delivered through such angled inlets are correspondingly impinged on the top surface of the foam material body for subsequent flow through the foam material body. When multiple angled inlets are present in the inlet assembly, they may be arranged in relation to one another so that the respective discharged streams of material from the corresponding inlets interact to effect mixing thereof and/or to generate hydrodynamic conditions that are effective and advantageous for the process being conducted in the non-autothermal adiabatic reactor. The angled inlet(s) may for example be oriented at an angle with respect to the central axis of the reactor vessel, wherein the included angle α between the central axis of the angled inlet in the inlet assembly and the central axis of the reactor vessel is in a range of $0°<\alpha<90°$, such as in a range of $5°<\alpha<80°$, a range of $10°<\alpha<75°$, a range of $15°<\alpha<65°$, or other suitable range for delivering reactant(s) to the interior volume of the non-autothermal adiabatic reactor.

In various embodiments, the foam material body may comprise ceramic material of suitable type and porosity characteristics.

In various embodiments, the foam material body may comprise foam material selected from the group consisting of vitreous carbon, metal carbides, metalloid carbides, metal foams, ceramic foams, and composites and mixtures thereof.

The vitreous carbon foam material may include vitreous carbon of various types, and may for example comprise reticulated vitreous carbon foam. Such reticulated vitreous carbon foam can be of any advantageous character, and may for example have pore size in a range of from 2 to 125 pores per inch (ppi), or a range of from 5 to 100 ppi, or from 10 to 80 ppi, or from 20 to 75 ppi, or from 30 to 70 ppi, or from 60 to 100 ppi, or in other suitable range.

The metal carbides may be of any suitable type, and may for example comprise hafnium carbide, niobium carbide, tantalum carbide, zirconium carbide, or titanium carbide, or composites or combinations of two or more of the foregoing.

The metalloid carbides may likewise be of any suitable type, and may for example comprise boron carbide, silicon carbide, germanium carbide, antimony carbide, or tellurium carbide, or composites or combinations of two or more of the foregoing.

The metal foams may for example comprise nickel, iron, copper, aluminum, or alloys thereof.

Ceramic foams may for example comprise alumina, zirconium, silica, magnesia, titania or composites or combinations thereof of two or more of the foregoing.

Silicon carbide foams are particularly advantageous, due to their properties, including compressive strength, shear strength, tensile strength, and flexural strength characteristics as well as their specific heat, maximum use temperature, heat transfer coefficient, and thermal expansion, surface area, cell structure, pore size, and pressure drop characteristics. The silicon carbide foam may for example have pore size in a range of from 2 to 125 pores per inch (ppi), or a range of from 5 to 100 ppi, or from 10 to 80 ppi, or from 20 to 75 ppi, or from 30 to 70 ppi, or from 60 to 100 ppi, or in other suitable range.

Ceramic foams may comprise oxides of aluminum, zirconium, titanium or silicon.

Metal foams may comprise any suitable metals, such as metals and metal alloys including aluminum, copper, steel, inconel, tin, gold, and silver.

The conversion catalyst on and/or in the foam material body may comprise catalyst for any of a wide variety of conversion reactions. For example, the conversion catalyst may be an oxidation catalyst that is effective to at least partially oxidize a hydrocarbon in the presence of oxygen, air or other oxygen-containing gas. The foam material may serve as a conversion catalyst itself, may act as a co-catalyst, or may enhance the properties of the conversion catalyst.

In various embodiments, the conversion catalyst comprises noble metal catalyst, mixed metal oxide catalyst, perovskite catalyst, hexaaluminate catalyst, or pyrochlore catalyst.

In various embodiments, the conversion catalyst comprises an oxidative reforming catalyst.

In other embodiments, the conversion catalyst may comprise metals such as aluminum, zirconium, nickel, magnesium, lanthanum, gadolinium, yttrium, cobalt, cerium, rhodium, palladium, platinum, ruthenium, or other noble metals, etc.

In various embodiments, the conversion catalyst may comprise mixed metal oxide catalysts, such as for example the mixed metal oxide catalysts described in U.S. Pat. No.

10,688,472. In various other specific embodiments, the catalyst may be a ruthenium catalyst or a nickel catalyst. In still other specific embodiments, the catalyst may be a platinum catalyst or a palladium catalyst. Other embodiments may utilize a catalyst including one or more metals selected from Pt, Ni, W, Ru, Au, Pd, Mo, Cu, Sn, Rh, and V.

The conversion catalyst may comprise oxidative reforming catalyst in various additional particular embodiments that may include one or more metals selected from Pd, Pt, Cu, Mn, and Rh. Further embodiments may utilize oxidative reforming catalysts including metal(s) selected from Group VIII of the Periodic Table.

It will be correspondingly appreciated that the foam material body in the adiabatic reactor of the present disclosure may be formed of catalyst material, or may be formed of material having catalyst therein and/or thereon, or may both be formed of catalyst material and have additional catalyst therein and/or thereon, of a same or alternatively a different material. As indicated, it will also be appreciated that the foam material body may comprise materials that enhance or augment catalytic action in and/or on the foam material body, such as promoters to increase the efficiency of the catalyst.

In a specific embodiment, the reactor of the present disclosure may be constituted with an inlet assembly including multiple feed inlets to introduce reactants such as ethanol or other hydrocarbon(s), steam, and oxygen or oxygen-containing gas to the interior volume of the reactor vessel at an upper portion thereof, for contacting with a partial oxidation catalyst coated on a foam material body, e.g., of silicon carbide foam or other foam material, as a first stage of conversion reaction, with the interior volume of the adiabatic reactor vessel containing the partial oxidation catalyst on the foam material body of a silicon carbide or other foam material as part of a staged assembly of catalyst beds, arranged so that exothermic reaction of partial oxidation of one or more of the feed components takes place in the first stage in contact with the partial oxidation catalyst on the silicon carbide or other foam material, driving an endothermic reaction of steam reforming in a second stage including a bed of steam reforming catalyst, resulting in a reduction in gas temperature from such endothermic second stage reaction, and with water-gas shift (WGS) catalyst being deployed in a high temperature slightly exothermic third stage to convert carbon monoxide to hydrogen, so that the composition of the gas discharged from the reactor vessel in the outlet thereof is predominantly hydrogen.

In such embodiment, the multiple feed inlets to introduce reactants including ethanol, steam, and oxygen-containing gas to the interior volume of the reactor vessel may be supplied by corresponding sources of ethanol, steam, and oxygen-containing gas, such as respective supply vessels containing the corresponding reactants, joined to the feed inlets of the reactor by suitable flow circuitry such as conduits or other feed lines containing valves and/or other flow control devices, as well as monitoring devices arranged to monitor process conditions, e.g., temperature, pressure, flow rate, composition, etc., of the reactants in the respective conduits or feed lines of the flow circuitry. The monitoring devices may be coupled in signal transmission relationship to a central processing unit (CPU) that in turn is arranged in control signal transmission relationship to correspondingly controlled devices in the flow circuitry, such as for example mass flow controllers, flow control valves, heaters, pumps, compressors, condensers, etc., as necessary or desirable in the specific operation of the system including the adiabatic reactor.

Thus, non-autothermal adiabatic reactor may be provided with a processor that is constructed and arranged to communicate process control information to controller(s) of the process equipment operatively associated with the reactor, to modulate process conditions in the reactor vessel in response to temperature sensing data communicated to the processor from a thermal sensing device such as thermocouple(s) disposed in the reactor to monitor temperature therein.

In various embodiments, wherein ethanol, steam, and oxygen-containing gas are introduced to the adiabatic reactor, or multistage catalytic reactions to produce hydrogen, the following conversion reaction may be performed:

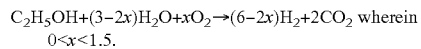
$C_2H_5OH+(3-2x)H_2O+xO_2 \rightarrow (6-2x)H_2+2CO_2$ wherein $0<x<1.5$.

The conversion reaction carried out in the adiabatic reactor thus may include partial oxidation reaction carried out in the first catalyst bed of the corresponding catalyst on and/or in the foam material body, at temperature in a range of from about 700° C. to about 900° C., with the first catalyst bed also controlling the formation of $CH_4$ in addition to CO, $CO_2$, and $H_2$, with the $CH_4$ mole fraction also being controllable by catalyst design, and with the partial oxidation reaction carried out in the first catalyst bed being followed by steam reforming reaction carried out in a second catalyst bed of steam reforming catalyst at temperature in a range of from about 450° C. to about 850° C. The steam reforming reaction is followed by a high temperature water gas shift reaction carried out in a third catalyst bed at temperature in a range of from about 300° C. to about 420° C. The high temperature water gas shift reaction may be carried out in the adiabatic reactor with the third catalyst bed being situated therein, but preferably the third catalyst bed is in a separate reactor that allows interstage cooling to the temperature range of 300° C. to 420° C. The high temperature water gas shift reaction is optionally followed by a low temperature water gas shift reaction carried out in a separate low temperature water gas shift reactor vessel containing the low temperature water gas shift catalyst. The product gas from the adiabatic reactor may thus in various embodiments be flowed to the separate low temperature water gas shift reactor if the high temperature water shift reaction is carried out in a third catalyst bed in the adiabatic reactor.

In other embodiments, the adiabatic reactor may be constructed and arranged to carry out oxidation and reforming actions therein, with product gas from the adiabatic reactor flowing to a separate vessel or vessels for carrying out high temperature water gas shift reaction and low temperature water gas shift reaction.

In such adiabatic reactor system, the source of ethanol may be of any suitable type and may for example comprise an ethanol storage tank, ethanol pipeline, or ethanol generation facility, such as an ethanol refinery producing ethanol from corn or other biomass feedstock, coupled with the adiabatic reactor by appropriate flow circuitry. The source of steam may be of any suitable type and may for example comprise a boiler, vaporizer, or other steam generator, coupled with the adiabatic reactor by appropriate flow circuitry. The source of oxygen-containing gas may be of any suitable type and may for example comprise a cryogenic oxygen generation system (an air separation unit, ASU), pressure swing adsorption (PSA) oxygen supply system, temperature swing adsorption (TSA) oxygen supply system, PSA/TSA oxygen supply system, or an electrolyzer apparatus, oxygen pipeline, or other suitable source, coupled with the adiabatic reactor by appropriate flow circuitry.

The adiabatic reactor may be constructed and arranged in various embodiments to produce syngas (mixtures including hydrogen ($H_2$) and carbon monoxide (CO) as predominant components) as a product gas, wherein $CO_2$ may be partially substituted for $H_2O$ (steam) in the oxidant/reforming feed gas to provide a lower $H_2/CO$ ratio. The product gas may thus comprise syngas (CO, $H_2$, $CO_2$) wherein ($H_2$ vol %–$CO_2$ vol %)/(CO vol %+$CO_2$ vol %)≥1.0.

The adiabatic reactor of the present disclosure utilizing a foam material body as a support for catalyst enables a substantial simplification and enhancement of efficiency of reactors heretofore used for autothermal conversion reactions, since the catalyst-bearing foam material body permits replacement of an autothermal burner, and since catalytic controlled partial oxidation is preferable to free radical oxidation reactions conducted in an autothermal reaction burner.

The adiabatic reactor of the present disclosure may be rendered adiabatic in character by any suitable structures, components, and arrangements, so that the reactions taking place in the reactor involve no heat exchange with the exterior environment of the reactor. For such purpose, the reactor may be interiorly and/or exteriorly insulated with a suitable insulant medium, e.g., insulation materials such as fiberglass, CMS wool, super wool, ceramic fiber, polycrystalline fiber, mineral rock wool, refractory cement, fire bricks, or some combination of insulating materials.

The adiabatic reactor may be of any suitable size and shape, as for example comprising a reactor vessel of cylindrical or tubular shape, internally and/or externally insulated to achieve the required internal reaction temperature, with feedstock reactants entering the reactor at an upper portion thereof with reaction products being discharged from the bottom portion of the reactor. By introducing respective reactants as gases flowed directly into the catalyst-bearing foam, e.g., a reticulated porous ceramic foam coated with an oxidation catalyst, gas mixing is facilitated and the catalytically mediated reaction is initiated with effective radial and axial distribution of the heat of reaction.

In contrast to an autothermal reactor utilizing a burner for initiation of the reaction, the injection of reactant gases or gas mixtures into the catalyst-coated foam in the adiabatic reactor of the disclosure avoids the formation and continued presence of flame in the reactor. The catalyst on the catalyst-coated foam in the adiabatic reactor thus initiates the desired reaction without the requirement of flame support therefor, and with the catalyst lowering the activation energy for the reaction and directing selectivity of the reaction towards desired product(s).

Feed gases may be introduced to the adiabatic reactor separately from one another in various embodiments. In other embodiments, feed gases may be introduced to the adiabatic reactor in mixture with one another. In various applications, it is advantageous to introduce feed gases separately, such as in applications in which the feed gases at preheat temperatures prior to entering the reactor may spontaneously react or decompose in an undesired manner. By introducing the gases separately, each gas can be preheated to the preferred temperature and introduced into the catalyst-coated foam in which mixing is facilitated by the 3-dimensional pore structure of the foam so that the respective gases react in the presence of the catalyst.

The catalyst-coated foam is advantageously sized with dimensions such that the entire upper section of the reactor internal volume is filled with the foam, with the foam having a width or transverse direction (with reference to the direction of gas flow through the reactor) that places the foam in close proximity to the circumscribing wall of the reactor interior volume, to avoid bypassing and/or other undesired anomalous hydrodynamic behavior, and with a length that enables the appropriate space velocity to be achieved for the desired extent of reactant conversion, ideally close to or equal to 100% reactant conversion. As distinguished from a packed bed of pellets, extrudates and/or particles, the foam occupies the reactor as a unitary foam body, which may be of single-piece character, or which is constituted by one or more foam pieces that fit tightly together to form an integrated unitary body. For such purpose, the foam pieces may be constituted as bricks, blocks, monolith, or other forms that may be consolidated to form a unitary foam material body.

The foam may be formed of any suitable material, including those illustratively mentioned hereinabove. In various embodiments, the foam may be formed of metal oxide or mixed metal oxide, including materials such as zirconia and alumina, or silicon carbide or other carbide materials. The foam provides a 3-dimensional network of interconnected pores that provide high surface area for catalyst so that the catalyst is present on and/or in the foam.

The catalyst may be deposited and/or otherwise formed on and/or in the foam by any suitable techniques or methods, such as for example spray application of catalyst to the foam, precipitation of catalyst onto and/or into the foam from a solution or suspension containing the catalyst, or other mode of application that places the catalyst on and/or in the foam.

As an illustrative example of reaction that can be conducted in the adiabatic reactor of the present disclosure, oxidative reforming of ethanol is described. The autoignition temperature of ethanol is 365° C. at ambient temperature. For oxidative reforming of ethanol, a preferred preheat temperature for reactants flowed to the adiabatic reactor is on the order of 450° C. If oxygen (15% v/v), steam (60% v/v), and ethanol (25% v/v) are mixed together and heated to such preheat temperature prior to introduction of the oxygen/steam/ethanol mixture to the adiabatic reactor, then there is a high probability that the oxidation reaction would begin prior to the mixed reactants reaching the adiabatic reactor, a circumstance creating undesirable reaction that raises safety concerns and results in poor yields of reaction products. By utilizing a separate feed line to the adiabatic reactor for a mixture of the oxygen and steam reactants, and a separate line to the adiabatic reactor for the ethanol reactant, the oxygen/steam mixture feed line can be heated to a sufficiently high temperature, and the ethanol feed line can be heated to a temperature that is below the autoignition temperature, such that when combined in contact with the foam catalyst bed, the combined temperatures of the respective feeds will be sufficient to initiate the oxidative reforming reaction. Since the reaction then occurs in the presence of the catalyst, the desired reaction selectivity is retained and safety concerns are correspondingly addressed and mitigated.

For such oxidative reforming of ethanol, the foam bearing the oxidation catalyst may be or comprise silicon carbide foam, which provides excellent heat transfer properties, high temperature resistance, low thermal expansion, and high mechanical strength. As a result of three-dimensional pore structure in the catalyst bearing foam, the foam provides radial heat and mass transfer yielding superior utilization of the reactor and catalyst volume.

The adiabatic reactor of the present disclosure is particularly useful for contacting reactions involving oxidation, partial oxidation, reforming and oxidative reforming of hydrocarbons and/or oxygenates, which may be carried out with additional reactants, e.g., water or steam, oxygen or oxygen-containing gas, such as air, oxygen-enriched air, carbon monoxide, carbon dioxide, etc., at its appropriate temperature, pressure, and space velocity to effect reaction producing syngas (as a mixture of hydrogen, carbon monoxide and carbon dioxide) or to effect reaction producing a product stream constituted primarily of hydrogen and carbon dioxide. The product streams containing CO and $CO_2$ then and be further processed for conversion of CO to $CO_2$, as well as recovery of $CO_2$ for further disposition or use, or for $CO_2$ sequestration.

More specifically, the adiabatic reactor of the present disclosure is useful for catalytic conversion of hydrocarbons and oxygenates, including $C_1$-$C_{14}$ alkanes, $C_1$-$C_{14}$ alkenes, $C_1$-$C_{14}$ alcohols, $C_1$-$C_{14}$ aldehydes, $C_1$-$C_{14}$ ketones, $C_1$-$C_{14}$ acids, and mixtures thereof, to produce syngas with an ideal ratio satisfying the equation $(H_2—CO_2)/(CO+CO_2) \geq 2.0$ and/or a product stream of predominately $H_2$ and $CO_2$ that can be easily separated using conventional separation technologies including pressure swing adsorption, temperature swing adsorption, and/or membrane(s) separation. A nearly pure carbon dioxide stream is achieved using pure oxygen in the conversion.

Figure 2:
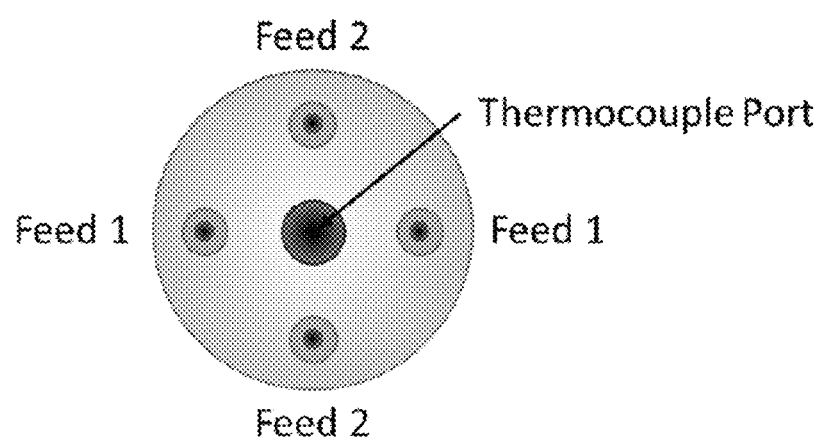
FIG. 2 is a top plan view of the reactor of FIG. 1.

An illustrative example of the adiabatic reactor with multiple reactant inlets and a catalyst-bearing foam at the upper section of the reactor is shown in FIGS. 1 and 2, wherein FIG. 1 is a partial sectional elevation view of the adiabatic reactor 10, and FIG. 2 is a top plan view of the adiabatic reactor 10 of FIG. 1.

As shown, the adiabatic reactor 10 comprises a cylindrical reactor vessel 12 defining an internal volume therewithin. The reactor includes a reactor inlet cap 14, with feed 1 inlet 16 therein for delivery of a first reactant composition, e.g., ethanol or other hydrocarbon feedstock, into the reactor vessel, and with feed 2 inlet 18 in the reactor inlet cap 14 for delivery of a second reactant composition, e.g., a mixture of oxygen and steam, into the reactor vessel. As depicted in FIG. 2, the reactor inlet cap 14 comprises two feed 1 inlets for respective introduction of separate streams of the first reactant composition, and two feed 2 inlets for respective introduction of ethanol or other hydrocarbon feedstock.

The adiabatic reactor 10 includes a thermocouple well 20 therein, in which thermocouples or other temperature monitoring devices may be disposed to sense temperature in respective portions of the reactor interior volume. Such thermocouples or other temperature monitoring devices may be arranged with signal transmission wires from the devices to a processor or central processing unit that in turn is arranged to receive the temperature monitoring signals from the temperature monitoring devices and to responsively transmit control signals in corresponding signal transmission lines to process control devices, such as pumps, compressors, preheat heaters, flow control valves, mass flow controllers, etc., to modulate operation of the process control devices to achieve desired operation of the adiabatic reactor. Such monitoring and control system is not specifically depicted, being of well-known and readily implemented character, for maintaining process conditions in the adiabatic reactor and associated process streams at set point values or within predetermined operating ranges to achieve a desired nature and extent of adiabatic reactions and production of desired products.

The adiabatic reactor can employ one or more feed inlets, and when multiple feed inlets are employed, as shown in FIGS. 1 and 2, such inlets may be distributed in circumferentially spaced apart relationship around the periphery of the reactor inlet cap 14 in a number and pattern that ensure uniform distribution of the feed gases that are injected into the catalyst-bearing foam bed 26. The catalyst-bearing foam bed provides efficient mixing of reactant gases, especially in the transverse direction that is perpendicular to the flow direction, in connection with the continuous impact between the flowing reactants and the porous morphology of the catalyst-bearing foam that generates turbulence within the gas flow stream.

As shown in FIG. 1, the feed 1 inlet 16 and feed 2 inlet 18 structures are oriented at an angle with respect to the central axis of the vertical upstanding reactor that may for example be in a range of from 20 to 90°, although the disclosure is not limited thereto and other angles or arrangements may be employed. By feeding gases at an angle in relation to the catalyst-bearing foam, it is possible to obtain highly optimized gas mixing within the foam.

Again, with reference to the thermocouple well 20, by installing an internal multipoint thermocouple in such thermocouple well, direct monitoring of internal temperature in the axial direction of the reactor is enabled, and the temperatures sensed by the multipoint thermocouple provide the axial temperature distribution within the adiabatic reactor. This is particularly useful when a sequential series of reactions is conducted in the reactor, wherein each of the series of reactions requires a different catalyst and a different reaction temperature in respective beds of catalyst in the reactor.

As an example, maximizing hydrogen yield in the oxidative reforming of ethanol requires an exothermic oxidation reaction coupled closely to a steam reforming reaction. Since the catalysts for these reactions are quite different, it is advantageous to employ the catalysts in a sequential configuration of catalyst beds. The oxidation and partial oxidation reactions of ethanol in the catalyst-bearing foam bed generate heat and a significant amount of methane. Such heat is beneficially employed to effect the endothermic steam reforming of methane and any unoxidized hydrocarbons in a second sequential bed located immediately below the foam bed.

In the absence of any catalyst in the upper portion of the reactor, the exothermic reaction of oxygen with ethanol (or other hydrocarbon) requires a specialized burner assembly and exotic metallurgy to accommodate a flame-mediated oxidation reaction. Such flame-mediated oxidation reaction, being a free radical reaction, produces an extremely rapid oxidation that may significantly impair the selectivity and yield of final products.

Additionally, if a conventional packed bed catalyst is employed at an upper section of the reactor, channeling becomes a substantial risk, with potential for forming hot spots due to poor radial heat and mass transfer. Localized high temperatures of such hot spots are deleterious to catalyst lifetime and product selectivity.

A further advantage of the adiabatic reactor of the present disclosure comprising a catalyst-bearing foam bed resides in the open structure of the catalyst-bearing foam yielding a very low pressure drop as compared to catalyst supports in the form of extrudates, pellets, spheres, and powders. Lower pressure drop in a reactor translates to savings in capital and operating costs of pumps, compressors, and related components of the reactor process system.

Referring again to FIG. 1, with respect to the overall structure of the adiabatic reactor depicted in such figure, the reactor inlet cap 14 as illustrated is secured to the cylindrical reactor vessel 12 by reactor cap securement flange assembly 22 in which mateably engageable flanges of the reactor inlet cap and cylindrical reactor vessel are secured to one another by associated bolt and nut mechanical fasteners. Such reactor inlet cap arrangement enables the reactor inlet cap 14 to be readily removed from the cylindrical reactor vessel 12 by removal of the bolt and nut mechanical fasteners, to facilitate access to the reactor volume interior including the foam catalyst bed and other catalyst beds and internal components of the reactor, for inspection, maintenance, repair or replacement of reactor internal components, change-out of catalyst bed materials, installation of sensors, or for the other purposes.

The reactor in the illustrative embodiment of FIG. 1 includes a reactor insulating sleeve 24 that may be formed of suitable thermal insulating material, such as material of the type or types previously tried herein, to provide the reactor with an adiabatic construction. The reactor includes the foam catalyst bed 26 in the upper inlet section of the reactor vessel. Below the foam catalyst bed 26 in sequential series relationship therewith are a second reactor bed 28, a third reactor bed 30, a fourth reactor bed 32, and a ceramic medium thermal ballast bed 34. The reactor includes a product discharge outlet 36, a reactor port closure 38 associated with an additional reactor port for access, maintenance, or introduction of purge gas or other medium, and a reactor skirt assembly 40 including the lower end portion of the reactor vessel.

The second, third, and fourth reactor beds may contain suitable catalysts for reactions successively conducted in the adiabatic reactor to produce the reaction products that are discharged from the reactor in product discharge outlet 36. For example, in the oxidative reforming of ethanol or other hydrocarbon feedstock, the second reactor bed 28 may comprise suitable reforming catalyst, the third reactor bed 30 may comprise suitable high temperature water gas shift reaction catalyst, and the fourth reactor bed 32 may comprise suitable low temperature water gas shift reaction catalyst.

The adiabatic reactor of the present disclosure may also be constructed and arranged with process monitoring and control components to carry out the catalytic process in the reactor, wherein the process monitoring may include monitoring of any of temperature, pressure, flow rate, composition, or other process conditions or parameters, with the monitoring data being processed by process controllers arranged to responsively generate process control signals for modulation of the monitored conditions or parameters by controlled operation of process modulation components such as mass flow controllers, valve actuators, variable speed pumps and compressors, heat exchangers, heaters, coolers, condensers, dehumidifiers, etc.

FIG. 1 shows an illustrative process monitoring and control system associated with the adiabatic reactor. The feed 1 inlet 16 as shown is supplied with feed 1 from a feed 1 source, which may be of any suitable type, and may for example comprise a vessel containing the feed 1 material, from which the feed 1 material is flowed in feed 1 supply line 44 to the feed 1 inlet 16. The feed 1 supply line 44 contains flow control valve 46 equipped with a flow control valve controller 48 connected to central process controller 52 by flow control valve controller signal input line 50.

In like manner, the feed 2 inlet 18 is supplied with feed 2 from a feed 2 source 54, which correspondingly may be of any suitable type, and may for example comprise a vessel containing the feed 2 material, from which the feed 2 material is flowed in feed 2 supply line 56 to the feed 2 inlet 18. The feed 2 supply line 56 contains flow control valve 58 equipped with a flow control valve controller 60 connected to central process controller 52 by flow control valve controller signal input line 62.

The adiabatic reactor as previously mentioned may incorporate thermal sensing devices, such as thermocouple elements in thermocouple well 20, and the thermocouple elements assembly, as arranged for sensing of temperature in a specific location or locations in the reactor, may be coupled by thermal sensor signal output line 64 that in turn is arranged to transmit thermal sensing data from the thermocouple elements assembly in the thermocouple well to the central process controller 52.

By such arrangement, the thermal sensing data from the thermocouple elements assembly in the thermocouple well is transmitted in the thermal sensor signal output line 64 to the central process controller 52, which then responsively modulates flow control valve controllers 48 and 60 by control signals transmitted to the respective flow control valve controllers in the flow control valve controller signal input lines 50 and 62 so that the respective flow control valves 46 and 58 are correspondingly adjusted by their controllers to maintain flow rates of the feed 1 and feed 2 materials, as well as the ratio of the flowrate of feed 1 material to the flow rate of feed 2, at levels producing setpoint temperatures or maintaining temperature operating ranges for the desired operation of the adiabatic reactor.

The central process controller 52 may comprise any suitable type of process controller and may for example comprise a programmable computer programmed with software instructions for monitoring and control of the adiabatic reactor operation by the correspondingly programmed computer, or programmable logic device devices programmed for such monitoring and control, or other electronic monitoring and control assemblies.

In the illustrated embodiment of FIG. 1, the adiabatic reactor system further comprises a reaction product discharge line 66 coupled to the product discharge outlet 36 of the reactor, which passes the reaction product gas to a heat reclamation assembly 68 in which heat of the reaction product gas is recovered. The heat reclamation assembly 68 for such purpose may comprise suitable heat exchangers, heat accumulator devices, or the like which served to extract heat from the reaction product gas. The correspondingly cooled reaction product gas is then discharged from the heat reclamation assembly 68 in the thermally modulated product discharge line 70 and flowed to further processing equipment or to other disposition or storage.

The reclaimed heat resulting from the extraction of heat from the reaction product gas may be advantageously utilized in the adiabatic reactor system, as for example is shown in FIG. 1, in which the heat reclamation assembly heat transfer line $Q_1$ delivers heat to feed 2 in the feed 2 source 54, and in which the heat reclamation assembly heat transfer line $Q_2$ delivers heat to feed 1 in the feed 1 source 42.

The central process controller 52 as part of its thermal management operation in the adiabatic reactor system may be arranged to transmit control signals to the heat reclamation assembly 68 to modulate the heat extraction operation thereof, and the transmission rate of extracted heat in heat transfer lines $Q_1$ and $Q_2$ to the feed 1 and feed 2 materials, so as to maintain the desired setpoint or operating range temperature in the adiabatic reactor for production of a desired reaction product gas. The control signals to the heat reclamation assembly 68 may be transmitted by the central process controller 52 wirelessly, or alternatively by signal transmission lines similar to those used to transmit control signals to the flow control valve controllers 48 and 60 as previously described.

It will be recognized that the number of catalyst beds in the adiabatic reactor of the present disclosure may be varied in the broad practice of the present disclosure, to include a greater or lesser number of catalyst beds than is illustratively depicted in FIG. 1. Accordingly, the reactor may include one, two, three, four, or more catalyst beds, it being required only that the first (or only) catalyst bed in the adiabatic reactor be a foam catalyst bed of catalyst-bearing foam.

The adiabatic reactor of the present disclosure thus embodies a design and integration of a foam catalyst bed at an upper inlet portion of the reactor vessel that distinguishes the reactor from conventional reactors and autothermal reformer apparatus. The adiabatic reactor integrating a foam catalyst bed in accordance with present disclosure is beneficial in applications in which (i) a reaction is highly exothermic with the potential for hotspots or runaway reaction in its performance, (ii) optimal heat transfer throughout the reactor is advantageous, (iii) avoidance of spontaneous reaction of two or more feed streams prior to catalyst contacting is required to preclude a safety hazard and/or poor yield and selectivity of the conversion of reactants to products, and (iv) optimal reaction requires an efficient radial gas mixing environment.

The adiabatic reactor of the present disclosure provides a wide range of variation of the number and location of reactant feed inlets to ensure uniform mixing and distribution of reactant gases entering the foam catalyst bed. Further, foams suitable for use in the adiabatic reactor of the present disclosure are commercially available in a wide variety of compositions, pore densities, sizes, shapes, and physicochemical properties. The foams may be constructed as sections that can be assembled in a closely packed arrangement so as to provide complete or substantially complete coverage of the interior section of the reactor. In addition, the adiabatic reactor of the present disclosure is scalable from small modular units to exceedingly large industrial scale reactors of the size and processing capacity that are typical in the chemical and refining industries.

In another aspect, the disclosure relates to a catalytic conversion process, comprising converting one or more reactants to one or more reaction products in a non-autothermal adiabatic reactor of the present disclosure as variously described herein.

In a particular aspect, the disclosure relates to a process for converting one or more gaseous reactants to one or more gaseous reaction products, comprising: impinging the one or more gaseous reactants on a foam body having a conversion catalyst thereon and/or therein in a non-autothermal adiabatic contacting zone to effect chemical conversion reaction catalyzed by the conversion catalyst on and/or in the foam body as at least part of chemical reaction performed in the non-autothermal adiabatic contacting zone producing the one or more gaseous reaction products; and discharging the one or more gaseous reaction products from the non-autothermal adiabatic contacting zone.

In such process, the foam body having the conversion catalyst thereon and/or therein may be a first catalyst bed of a sequence of multiple catalyst beds in the non-autothermal adiabatic contacting zone with which gas flowing through the non-autothermal adiabatic contacting zone is successively contacted to produce the one or more gaseous reaction products that are discharged from the non-autothermal adiabatic contacting zone.

The sequence of multiple catalyst beds may for example comprise two, three, four, or more catalyst beds in the non-autothermal adiabatic contacting zone. For example, the sequence of multiple catalyst beds may comprise the foam body having the conversion catalyst thereon and/or therein as a first catalyst bed, wherein the conversion catalyst on and/or in the foam body comprises a partial oxidation catalyst, with the sequence comprising a second catalyst bed of a steam reforming catalyst, downstream of the foam body comprising the partial oxidation catalyst, a third catalyst bed of a high temperature water gas shift reaction catalyst, downstream of the second catalyst bed, and a fourth catalyst bed of a low temperature water gas shift reaction catalyst, downstream of the third catalyst bed.

In the process, the one or more gaseous reactants may comprise ethanol, steam, and oxygen or oxygen-containing gas. The one or more gaseous reaction products may include hydrogen, as well as syngas. In various embodiments, the process may be conducted with the ethanol being supplied from an ethanol refinery, pipeline, storage vessel or other source. In various embodiments, the process may be conducted with oxygen or oxygen-containing gas being supplied from a water electrolyzer.

Although the disclosure herein is directed in various embodiments thereof to use of the non-autothermal adiabatic reactor of the present disclosure for processes utilizing ethanol as a feedstock, the disclosure is not limited thereto, and it is therefore to be appreciated that the non-autothermal adiabatic reactor may be utilized for any other suitable processes employing any other suitable feedstock or reactant materials. For example, feedstocks in other embodiments may include methane, ethane, natural gas, renewable natural gas, biodiesel, or other gaseous hydrocarbons or oxygenates, for production of hydrogen, syngas, and/or other products. As a further specific example, natural gas may be employed as a feedstock, and may be premixed with steam and oxygen prior to introduction via multiple inlets into the interior volume of the non-autothermal adiabatic reactor.

In various embodiments, the non-autothermal adiabatic reactor of the present disclosure is constructed and arranged to operate at suitable operating ranges of space velocity, pressure, temperature, and reactant concentrations for the particular applications for which the non-autothermal adiabatic reactor is employed.

For example, in the application of conversion of ethanol to hydrogen and syngas, space velocities may be employed in a range of from 1000 to 20,000 $hr^{-1}$, preferably 2500 to 7500 $hr^{-1}$, and most preferably 3000 to 5000 $hr^{-1}$. Pressures in such application may for example be in a range of from 5 to 100 bar, preferably 10 to 50 bar, and most preferably from 15 to 30 bar. Adiabatic exit temperatures in such application are controlled by space velocity and reactant molar ratios, and the oxygen/ethanol molar ratio may for example be in a range of from 0.4 to 1.2, more preferably from 0.5 to 1.0, and most preferably from 0.6 to 0.8, and the steam/ethanol molar ratio may for example be in a range of from 0 to 7, more preferably from 2 to 6, and most preferably from 3 to 5. The foregoing process conditions for conversion of ethanol to hydrogen and syngas are illustrative of conditions that may be employed, but the disclosure is not limited thereto, and other conditions may advantageously be employed.

The adiabatic reactor of the present disclosure has broad utility in a wide variety of catalytic chemical reaction applications. For example, the adiabatic reactor of the present disclosure may be advantageously utilized in hydrogen generation systems and processes of the type described in U.S. Pat. No. 11,649,549 issued May 16, 2023 for "OXIDATIVE REFORMING AND ELECTROLYSIS SYSTEM AND PROCESS FOR HYDROGEN GENERATION" and in U.S. patent application Ser. No. 18/317,078 filed May 13, 2023 for "OXIDATIVE REFORMING AND ELECTROLYSIS SYSTEM AND PROCESS FOR HYDROGEN GENERATION" and published on Sep. 7, 2023 as U.S. Patent Application Publication 2023/0278860 A1, the disclosures of which are hereby incorporated herein by reference, in their respective entireties.

The features and advantages of the present disclosure are more fully appreciated by reference to the following non-limiting Example of the disclosure, illustratively describing an implementation of the disclosure in one specific embodiment thereof.

Example 1

The adiabatic reactor of the present disclosure is utilized in a 300 kg/day ethanol to hydrogen process system.

Feedstock ethanol at approximately 95% by volume (remainder water) is pumped from storage tanks to a preheater and evaporator using residual heat from a fired heater to fully evaporate the feedstock. The evaporated feedstock ethanol then is heated in a heater coil of the heater. Steam is mixed with the feedstock ethanol vapor upstream of the heater as needed to ensure that temperature is maintained no higher than 375° C., and the ethanol-water mixture is then fed to the adiabatic reactor in the inlet assembly at the top of the vertical cylindrical reactor.

Separately, pure oxygen is mixed with steam and preheated in a separate coil in the same fired heater. The oxygen is heated to a temperature of 600° C. to ensure light-off in the presence of ethanol and the catalyst, and then fed separately to the adiabatic reactor in the inlet assembly of the reactor.

The adiabatic reactor contains two layers of catalyst. A first upper layer is a partial oxidation catalyst impregnated on a foam structure, as a first catalyst bed at an upper part of the interior volume of the adiabatic reactor. The foam structure ensures good mixing through microchannels within the foam. This first catalyst causes the ethanol to partially oxidize in the presence of oxygen, providing heat for the remaining reactions. The first catalyst also converts ethanol to methane, hydrogen, CO, and $CO_2$. The second layer of catalyst is in a second catalyst bed in the interior volume of the reactor below the first catalyst bed, and is a steam reforming catalyst that converts the remaining methane to hydrogen, CO, and $CO_2$.

The resulting syngas is discharged from the adiabatic reactor and cooled in a boiler, then fed to a high temperature water gas shift reactor to convert CO and water to $CO_2$ and hydrogen. The effluent from the high temperature water gas shift reactor is cooled in a boiler and a feedwater preheater to reach the desired temperature and then is flowed from the high temperature water gas shift reactor to a low temperature water gas shift reactor. The low temperature water gas shift reactor converts much of the remaining CO to hydrogen.

The gas discharged from the low temperature water gas shift reactor is cooled by returned process condensate and cooling water to about 40° C. Water that condenses is separated in a syngas separator, and the resulting gas is flowed to a pressure swing adsorber (PSA). The PSA assembly includes nine vessels filled with adsorbents that capture impurities in the syngas stream, to produce pure hydrogen gas as a product. The PSA vessels operate on a continuous cycle of depressuring and purging to remove contaminants and regenerate the adsorbents.

Pure hydrogen from the PSA assembly is compressed to 2350 psig by a three-stage reciprocating compressor. The resulting high-pressure hydrogen is then loaded into either 12-bottle cradles or tube trailers. Tail gas from the PSA is used as fuel in the fired heater. Hot gas from the fired heater is passed through a boiler to recover heat, followed by additional heat recovery in the ethanol evaporator and pre-heater. A fan is used to maintain furnace pressure and to recycle flue gas to dilute the oxygen and control temperature.

Process condensate from the syngas separator is fed to a deaerator to remove dissolved gases and reused as boiler feedwater. A small amount of makeup water is required to replace the water consumed in the reactions. Makeup water to the deaerator is provided via a reverse osmosis unit, which passes feed water through reverse osmosis (RO) membranes at high pressure to achieve the desired water purity. A surge tank is provided to store about 24 hours supply of makeup water to allow for membrane changes or other maintenance on the RO assembly. Cooling water is supplied by an evaporative cooling tower system with circulating pumps.

The present disclosure contemplates a variety of embodiments and implementations of the adiabatic reactor for carrying out conversion reactions of reactants to form products, including the specific Embodiments 1-58 set out below.

Embodiment 1: A non-autothermal adiabatic reactor comprising:
    a reactor vessel defining an interior volume therein for adiabatic reaction;
    an inlet assembly including one or more feed inlets arranged to introduce reactant(s) to the interior volume of the reactor vessel at an upper part thereof;
    a foam body having a conversion catalyst thereon and/or therein, positioned in the interior volume of the reactor vessel for contacting thereof by the reactant(s) introduced to the interior volume, and an outlet arranged to discharge reaction product(s) from the reactor vessel.

Embodiment 2: The non-autothermal adiabatic reactor of Embodiment 1, wherein the reactor vessel is vertically upstanding, with the inlet assembly positioned at an upper end portion thereof, and with the foam body having the conversion catalyst thereon and/or therein positioned in the upper end portion of the reactor vessel so that reactant(s) introduced by the inlet assembly to the interior volume of the vessel are contacted with the foam body having the conversion catalyst thereon and/or therein, prior to any other catalyst bed in the reactor vessel.

Embodiment 3: The non-autothermal adiabatic reactor of Embodiment 1, wherein the reactor vessel is of cylindrical form.

Embodiment 4: The non-autothermal adiabatic reactor of Embodiment 1, wherein the reactor vessel is insulated interiorly and/or exteriorly for adiabatic operation of the reactor.

Embodiment 5: the non-autothermal adiabatic reactor of Embodiment 1, wherein the foam body having the conversion catalyst thereon and/or therein is formed of a porous ceramic material or a porous metal material.

Embodiment 6: The non-autothermal adiabatic reactor of Embodiment 1, wherein the foam body having the conversion catalyst thereon and/or therein comprises porous foam material selected from the group consisting of ceramics, vitreous carbon, metals, metal carbides, and metalloid carbides.

Embodiment 7: The non-autothermal adiabatic reactor of Embodiment 1, wherein the foam body having the conversion catalyst thereon and/or therein comprises porous vitreous carbon foam.

Embodiment 8. The non-autothermal adiabatic reactor of Embodiment 7, wherein the porous vitreous carbon foam comprises reticulated vitreous carbon foam.

Embodiment 9: The non-autothermal adiabatic reactor of Embodiment 8, wherein the porous vitreous carbon foam comprising reticulated vitreous carbon foam has a pore size pore size in a range of from 2 to 125 pores per inch (ppi).

Embodiment 10: The non-autothermal adiabatic reactor of Embodiment 1, wherein the foam body having the conversion catalyst thereon and/or therein comprises a metal carbide porous foam material.

Embodiment 11: The non-autothermal adiabatic reactor of Embodiment 10, wherein the metal carbide porous foam material comprises material selected from the group consisting of hafnium carbide, niobium carbide, tantalum carbide, zirconium carbide, and titanium carbide, and composites and combinations of two or more of the foregoing.

Embodiment 12: The non-autothermal adiabatic reactor of Embodiment 1, wherein the foam body having the conversion catalyst thereon and/or therein comprises a metalloid carbide porous foam material.

Embodiment 13. The non-autothermal adiabatic reactor of Embodiment 12, wherein the metalloid carbide porous foam material comprises material selected from the group consisting of boron carbide, silicon carbide, germanium carbide, antimony carbide, and tellurium carbide, and composites and combinations of two or more of the foregoing.

Embodiment 14: The non-autothermal adiabatic reactor of Embodiment 13, wherein the metalloid carbide porous foam material comprises silicon carbide.

Embodiment 15: The non-autothermal adiabatic reactor of Embodiment 14, wherein the metalloid carbide porous foam material comprising silicon carbide has a pore size pore size in a range of from 2 to 125 pores per inch (ppi).

Embodiment 16: The non-autothermal adiabatic reactor of Embodiment 1, wherein the conversion catalyst comprises an oxidation catalyst that is effective to at least partially oxidize a hydrocarbon and/or oxygenate in the presence of oxygen, air or other oxygen-containing gas.

Embodiment 17: The non-autothermal adiabatic reactor of Embodiment 1, wherein the conversion catalyst comprises noble metal catalyst, mixed metal oxide catalyst, perovskite catalyst, hexaaluminate catalyst, or pyrochlore catalyst.

Embodiment 18: The non-autothermal adiabatic reactor of Embodiment 1, wherein the conversion catalyst comprises an oxidative reforming catalyst.

Embodiment 19: The non-autothermal adiabatic reactor of Embodiment 1, wherein the conversion catalyst comprises at least one selected from the group consisting of aluminum, zirconium, nickel, magnesium, gadolinium, lanthanum, yttrium, cobalt, cerium, rhodium, ruthenium, and noble metals.

Embodiment 20: The non-autothermal adiabatic reactor of Embodiment 1, wherein the conversion catalyst comprises a mixed metal oxide catalyst.

Embodiment 21: The non-autothermal adiabatic reactor of Embodiment 1, wherein the conversion catalyst comprises rhodium.

Embodiment 22: The non-autothermal adiabatic reactor of Embodiment 1, wherein the conversion catalyst comprises nickel.

Embodiment 23: The non-autothermal adiabatic reactor of Embodiment 1, wherein the conversion catalyst comprises platinum.

Embodiment 24: The non-autothermal adiabatic reactor of Embodiment 1, wherein the conversion catalyst comprises palladium.

Embodiment 25: The non-autothermal adiabatic reactor of Embodiment 1, wherein the conversion catalyst comprises one or more selected from the group consisting of Pt, Ni, W, Ru, Au, Pd, Mo, Cu, Sn, Rh, and V.

Embodiment 26: The non-autothermal adiabatic reactor of Embodiment 1, wherein the conversion catalyst comprises one or more selected from the group consisting of Pd, Pt, Cu, Mn, and Rh.

Embodiment 27: The non-autothermal adiabatic reactor of Embodiment 1, wherein the conversion catalyst comprises one or more selected from the group consisting of metals of Group VIII of the Periodic Table.

Embodiment 28: The non-autothermal adiabatic reactor of Embodiment 1, wherein the inlet assembly includes multiple feed inlets arranged to introduce reactant(s) to the interior volume of the reactor vessel.

Embodiment 29: The non-autothermal adiabatic reactor of Embodiment 28, wherein one of the multiple feed inlets is coupled with a source of ethanol.

Embodiment 30: The non-autothermal adiabatic reactor of Embodiment 29, wherein the source of ethanol comprises an ethanol refinery.

Embodiment 31: The non-autothermal adiabatic reactor of Embodiment 29, wherein the source of ethanol comprises an ethanol pipeline.

Embodiment 32: The non-autothermal adiabatic reactor of Embodiment 29, wherein the source of ethanol comprises a vessel containing ethanol.

Embodiment 33: The non-autothermal adiabatic reactor of Embodiment 28, wherein one of the multiple feed inlets is coupled with a source of water or steam and a source of oxygen or oxygen-containing gas.

Embodiment 34: The non-autothermal adiabatic reactor of Embodiment 33, wherein the source of oxygen or oxygen-containing gas comprises a water electrolyzer.

Embodiment 35: The non-autothermal adiabatic reactor of Embodiment 1, wherein the interior volume of the reactor vessel, in addition to the foam body having the conversion catalyst thereon and/or therein as a first catalyst bed, further contains one, two, three, or more additional catalyst beds.

Embodiment 36: The non-autothermal adiabatic reactor of Embodiment 35, wherein the conversion catalyst on and/or in the foam body comprises a partial oxidation catalyst.

Embodiment 37: The non-autothermal adiabatic reactor of Embodiment 36, wherein the reactor vessel interior volume further contains a second catalyst bed of a steam reforming catalyst, downstream of the foam body comprising the partial oxidation catalyst.

Embodiment 38: The non-autothermal adiabatic reactor of Embodiment 37, wherein the reactor vessel interior volume further contains a third catalyst bed of a high temperature water gas shift reaction catalyst.

Embodiment 39: The non-autothermal adiabatic reactor of Embodiment 38, wherein the reactor vessel interior volume further contains a fourth catalyst bed of a low temperature water gas shift reaction catalyst.

Embodiment 40: The non-autothermal adiabatic reactor of Embodiment 1, further comprising a thermal sensing device arranged to monitor temperature in the interior volume of the reactor vessel.

Embodiment 41: The non-autothermal adiabatic reactor of Embodiment 40, wherein the thermal sensing device comprises one or more than one thermocouple.

Embodiment 42: The non-autothermal adiabatic reactor of Embodiment 40, wherein the thermal sensing device is constructed and arranged to communicate temperature sensing data to a processor.

Embodiment 43: The non-autothermal adiabatic reactor of Embodiment 42, wherein the processor is constructed and arranged to communicate process control information to controller(s) of process equipment operatively associated with the non-autothermal adiabatic reactor, to modulate process conditions in the reactor vessel in response to temperature sensing data communicated to the processor from the thermal sensing device.

Embodiment 44: The non-autothermal adiabatic reactor of Embodiment 1, comprising a process monitoring and control system constructed and arranged to modulate process conditions in the reactor vessel.

Embodiment 45: A catalytic conversion process, comprising converting one or more reactants to one or more reaction products in a non-autothermal adiabatic reactor according to any one of Embodiments 1 to 44.

Embodiment 46: A process for converting one or more gaseous reactants to one or more gaseous reaction products, comprising: impinging the one or more gaseous reactants on a foam body having a conversion catalyst thereon and/or therein in a non-autothermal adiabatic contacting zone to effect chemical conversion reaction catalyzed by the conversion catalyst on and/or in the foam body as at least part of chemical reaction performed in the non-autothermal adiabatic contacting zone producing the one or more gaseous reaction products; and discharging the one or more gaseous reaction products from the non-autothermal adiabatic contacting zone.

Embodiment 47: A process according to Embodiment 46, wherein the foam body having the conversion catalyst thereon and/or therein is a first catalyst bed of a sequence of multiple catalyst beds in the non-autothermal adiabatic contacting zone with which gas flowing through the non-autothermal adiabatic contacting zone is successively contacted to produce the one or more gaseous reaction products that are discharged from the non-autothermal adiabatic contacting zone.

Embodiment 48: A process according to Embodiment 47, wherein the sequence of multiple catalyst beds comprises two, three, four, or more catalyst beds in the non-autothermal adiabatic contacting zone.

Embodiment 49: A process according to Embodiment 47, wherein the sequence of multiple catalyst beds comprises the foam body having the conversion catalyst thereon and/or therein as a first catalyst bed, wherein the conversion catalyst on and/or in the foam body comprises a partial oxidation catalyst.

Embodiment 50: a process according to Embodiment 49, wherein the sequence of multiple catalyst beds comprises a second catalyst bed of a steam reforming catalyst, downstream of the foam body comprising the partial oxidation catalyst.

Embodiment 51: A process according to Embodiment 50, wherein the sequence of multiple catalyst beds comprises a third catalyst bed of a high temperature water gas shift reaction catalyst.

Embodiment 52: A process according to Embodiment 51, wherein the sequence of multiple catalyst beds comprises a fourth catalyst bed of a low temperature water gas shift reaction catalyst.

Embodiment 53: A process according to Embodiment 46, wherein the one or more gaseous reactants comprises ethanol, steam, and oxygen or oxygen-containing gas.

Embodiment 54: A process according to Embodiment 53, wherein the one or more gaseous reaction products comprises hydrogen.

Embodiment 55: A process according to Embodiment 54, wherein the one or more gaseous reaction products further comprises syngas.

Embodiment 56: A process according to any one of Embodiments 53 to 55, wherein the ethanol is supplied from an ethanol refinery, and wherein the oxygen or oxygen-containing gas is supplied from a water electrolyzer.

Embodiment 57: The non-autothermal adiabatic reactor of Embodiment 1, wherein at least one of the one or more feed inlets of the inlet assembly is oriented at an angle with respect to a central axis of the reactor vessel, e.g., so that the reactant(s) delivered through such angled inlet(s) are correspondingly impinged on the top surface of the foam material body for subsequent flow through the foam material body, e.g., wherein the included angle $\alpha$ between a central axis of the angled inlet in the inlet assembly and a central axis of the reactor vessel is in a range of $0°<\alpha<90°$, such as in a range of $5°<\alpha<80°$, a range of $10°<\alpha<75°$, a range of $15°<\alpha<65°$, or other suitable range.

Embodiment 58: A process according to Embodiment 46, as conducted in a non-autothermal adiabatic reactor according to Embodiment 57.

Set out below is an identification of the reference numbers used in the drawings herein and the corresponding elements, features, components, and structures denoted by such reference numbers.

LISTING OF REFERENCE NUMBERS 10 adiabatic reactor
12 cylindrical reactor vessel
14 reactor inlet cap
16 feed 1 inlet
18 feed 2 inlet
20 thermocouple well
22 reactor cap securement flange assembly
24 reactor insulating sleeve
26 foam catalyst bed
28 second reactor bed
30 third reactor bed
32 fourth reactor bed
34 ceramic medium thermal ballast bed
36 product discharge outlet
38 reactor port closure
40 reactor skirt assembly
42 feed 1 source
44 feed 1 supply line
46 flow control valve
48 flow control valve controller
50 flow control valve controller signal input line
52 central process controller
54 feed 2 source
56 feed 2 supply line
58 flow control valve
60 flow control valve controller
62 flow control valve controller signal input line
64 thermal sensor signal output line
66 reaction product discharge line
68 heat reclamation assembly
70 thermally modulated product discharge line
$Q_1$ heat reclamation assembly heat transfer line
$Q_2$ heat reclamation assembly heat transfer line

What is claimed is:

1. A process for converting one or more gaseous reactants to one or more gaseous reaction products, comprising:
impinging the one or more gaseous reactants on a foam body having a conversion catalyst thereon and/or therein in a non-autothermal adiabatic contacting zone to effect chemical conversion reaction catalyzed by the conversion catalyst on and/or in the foam body as at least part of chemical reaction performed in the non-autothermal adiabatic contacting zone producing the one or more gaseous reaction products; and
discharging the one or more gaseous reaction products from the non-autothermal adiabatic contacting zone,
wherein the one or more gaseous reactants are impinged on an inlet surface of the foam body having the conversion catalyst thereon and/or therein, at an angle $\alpha$ with respect to a central axis of the non-autothermal adiabatic contacting zone, for subsequent flow through the foam body, the angle being in a range of $10°<\alpha<75°$, and
wherein the chemical conversion reaction catalyzed by the conversion catalyst on and/or in the foam body comprises an exothermic catalytic partial oxidation reaction as a first stage of the chemical reaction performed in the non-autothermal adiabatic contacting zone, driving an endothermic reaction as a second stage of the chemical reaction performed in the non-autothermal adiabatic contacting zone.

2. The process of claim 1, wherein the endothermic reaction comprises an endothermic steam reforming reaction performed in a bed comprising steam reforming catalyst, and wherein the bed comprising steam reforming catalyst is downstream from the foam body in the non-autothermal adiabatic contacting zone.

3. The process of claim 2, further comprising at least partially conducting a water gas shift reaction following the endothermic steam reforming reaction, (i) as a third stage of the chemical reaction performed in the non-autothermal adiabatic contacting zone, or (ii) exterior to the non-autothermal adiabatic contacting zone, in a water gas shift reactor downstream of the autothermal adiabatic contacting zone.

4. The process of claim 1, wherein the chemical reaction performed in the non-autothermal adiabatic contacting zone comprises oxidative reforming of hydrocarbon(s).

5. The process of claim 4, wherein the hydrocarbon(s) comprise methane, ethane, natural gas, renewable natural gas, biodiesel, or mixtures thereof.

6. The process of claim 1, wherein the one or more gaseous reaction products comprises hydrogen.

7. The process of claim 1, wherein the one or more gaseous reaction products comprises methane.

8. The process of claim 1, wherein the chemical reaction performed in the non-autothermal adiabatic contacting zone comprises oxidative reforming of oxygenate(s).

9. The process of claim 8, wherein the oxygenate(s) comprise alcohol.

10. The process of claim 9, wherein the alcohol comprises methanol, ethanol, isopropyl alcohol, n-butanol, and tert-butanol, or combinations thereof.

11. The process of claim 8, wherein the oxygenate comprises ethanol.

12. The process of claim 8, wherein the oxygenate comprises ether.

13. The process of claim 8, wherein the oxygenate comprises glycol.

14. The process of claim 8, wherein the oxygenate comprises aldehyde.

15. The process of claim 8, wherein the oxygenate comprises acid.

16. The process of claim 1, wherein the foam body comprises porous ceramic material or porous metal material.

17. The process of claim 1, wherein the foam body comprises porous foam material selected from the group consisting of ceramics, vitreous carbon, metals, metal carbides, and metalloid carbides.

18. The process of claim 1, wherein the foam body comprises SiC.

19. The process of claim 1, wherein the foam body comprises alumina.

20. The process of claim 1, wherein the conversion catalyst on and/or in the foam body comprises at least one selected from the group consisting of Al, Zr, Ni, Mg, Gd, La, Y, Co, Ce, Rh, Ru, Pt, W, Au, Pd, Mn, Cu, Sn, and V.

21. The process of claim 1, wherein the conversion catalyst on and/or in the foam body comprises noble metal catalyst, mixed metal oxide catalyst, perovskite catalyst, hexaaluminate catalyst, or pyrochlore catalyst.

22. The process of claim 1, wherein the one or more gaseous reactants comprises oxygen or oxygen-containing gas.

23. The process of claim 22, wherein the oxygen or oxygen-containing gas is supplied from an air separation unit.

24. The process of claim 22, wherein the oxygen or oxygen-containing gas is supplied from a water electrolyzer.

25. The process of claim 22, wherein the oxygen or oxygen-containing gas is supplied from a pressure swing adsorption (PSA) unit, a temperature swing adsorption (TSA) unit, or a pressure swing adsorption/temperature swing adsorption (PSA/TSA) unit.

26. The process of claim 22, wherein the oxygen or oxygen-containing gas is supplied from an oxygen pipeline or storage vessel.

27. The process of claim 1, wherein the one or more gaseous reactants comprises natural gas, and the one or more gaseous reaction products comprises syngas.

28. The process of claim 1, wherein the one or more gaseous reactants comprises ethanol, and the one or more gaseous reaction products comprises hydrogen.

29. The process of claim 1, comprising recovering heat from one or more of the one or more gaseous reaction products discharged from the non-autothermal adiabatic contacting zone.

30. The process of claim 1, comprising heating one or more of the one or more gaseous reactants prior to introduction thereof to the non-autothermal adiabatic contacting zone with heat recovered from one or more of the one or more gaseous reaction products discharged from the non-autothermal adiabatic contacting zone.

* * * * *